Oct. 28, 1941.  R. D. CLEMSON  2,260,297
MOWER
Filed Feb. 14, 1939  2 Sheets-Sheet 1
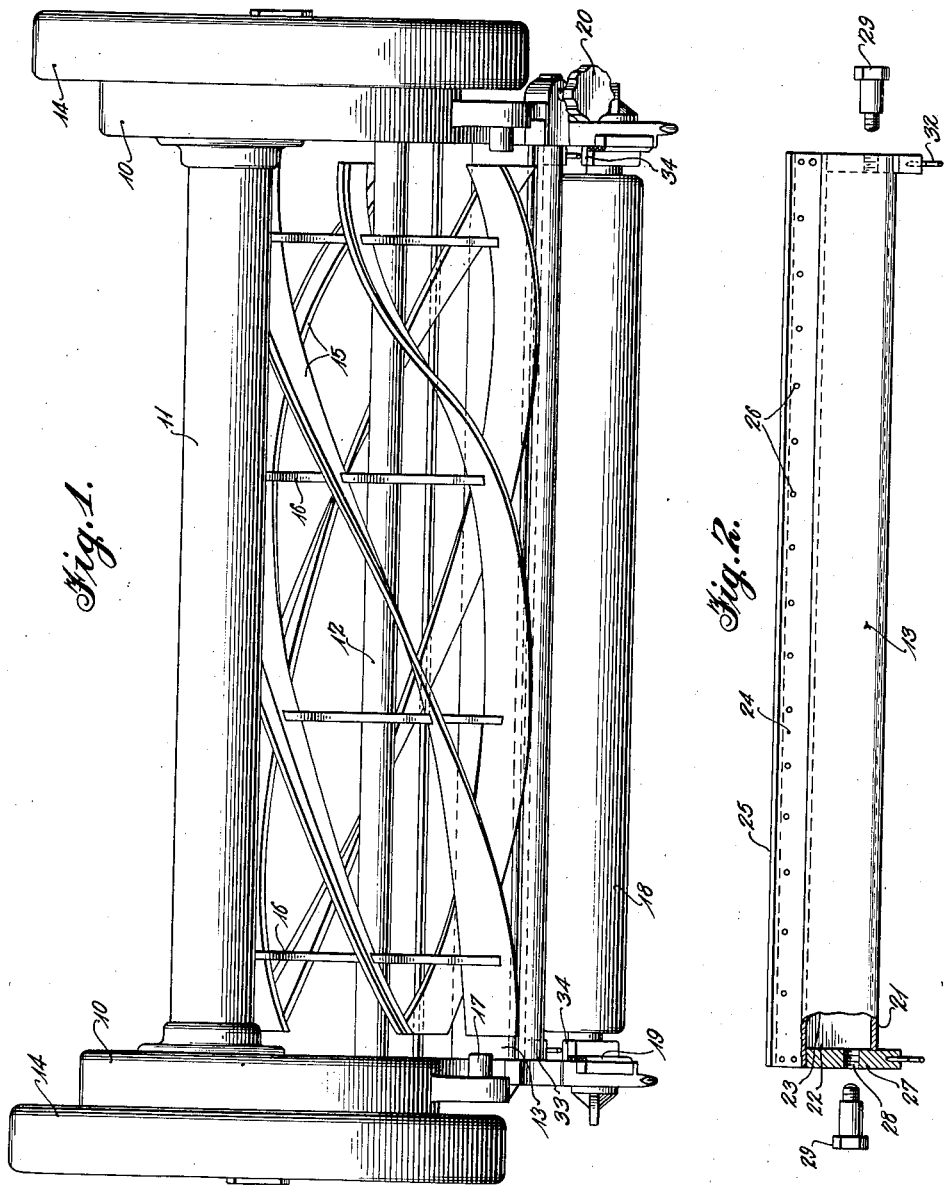
Inventor
Richard D. Clemson Oct. 28, 1941.  R. D. CLEMSON  2,260,297
MOWER
Filed Feb. 14, 1939  2 Sheets-Sheet 2

Inventor
Richard D. Clemson
By
Attorneys

Patented Oct. 28, 1941

2,260,297

UNITED STATES PATENT OFFICE 2,260,297

MOWER

Richard D. Clemson, Middletown, N. Y., assignor to Clemson Bros., Inc., Middletown, N. Y., a corporation of New York Application February 14, 1939, Serial No. 256,377

2 Claims. (Cl. 56—294)

This invention relates to an improved bed knife for lawn mowers of the rotary cutting reel type and to a preferred method of making the same.

Lawn mowers of the type to which the bed knife of this invention is particularly adapted have a frame mounted on wheels which roll on the ground during normal use and a rotary cutting reel mounted on the frame between the wheels and ordinarily operatively connected thereto by a transmission device, which causes the reel to rotate when the mower is propelled over a lawn or the other area to be sheared. Fly knives arranged about the rotary cutting reel are usually spiral in form and positioned with their cutting edges lying in an approximate geometric cylinder concentric with the reel axle. The bed knife is positioned on the lower part of the frame in such manner that the cutting edge thereof lies on said geometric cylinder in order that each of the fly knives in turn will make a progressive shearing contact therewith as the reel rotates. It is generally customary to pivotally mount the bed knife in order that the same may be adjusted from time to time to compensate for normal wear of the cutting members.

In order to transmit the necessary pressure evenly from the adjusting device to the edge of the bed knife, it has been customary to provide a rigid back of heavy steel or cast iron to which the bed knife proper is attached. This structure accounts for a considerable part of the cost of the entire machine and adds greatly to its weight.

It is an object of my invention to provide a bed knife construction which will be superior in its physical properties and its functioning and less costly to produce than any heretofore known. It is a particular object to improve the resilient recovery from impacts suffered in service. Another object is to lessen the weight. Another object is to permit the use of more expensive alloy best suited to the desired physical qualities without increasing cost and to attain the uniformity of physical properties which may be had in sheet metal as compared with castings. Another object is to provide a simple and inexpensive method of making bed knives. Other objects and advantages will appear from the following description.

According to the present invention, a strip of good quality sheet metal, such as cold rolled alloy steel, is bent to form an approximate three sided prism of a suitable length and the edges of the strip are welded together by continuous welding or spot welding at suitable intervals, e. g., so as to form an extension of one side of the prism. One of said edges may then be turned upward to form a lip which is subsequently ground to form the cutting edge of the bed knife. The open ends of the prism are closed with rigid blocks which serve to provide a means of attachment to the mower frame and impart additional rigidity to the prismatic portion of the bed knife. These end blocks may be stamped from heavy sheet and welded or otherwise secured to the ends of the looped strip or they may be cast in situ,—e. g., of die casting alloy cast in suitable dies.

A bed knife of this form is particularly well adapted to function in accordance with my concept of "reaction cut" as disclosed in my copending application Serial No. 52,757, filed December 4, 1935, now Patent No. 2,183,544, and if made of relatively thin resilient strip provided with a lip it may function in accordance with my invention described and claimed in my application Serial No. 148,837, filed June 18, 1937, now Patent No. 2,183,545.

It is to be clearly understood that the present invention has a wider applicability than only with constructions suitable for operation in accordance with the above noted concept of reaction cut. The present bed knife is admirably fitted to use with any of the well known types of lawn mowers now in use.

Fig. 1 is a plan view of a mower unit comprising the bed knife of this invention;

Fig. 2 represents a plan in partial section of the bed knife;

Figure 3:
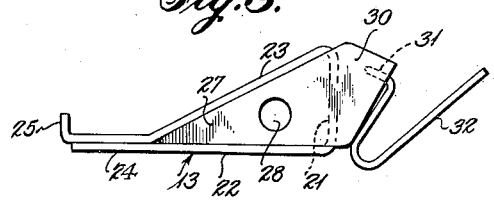
Fig. 3 is an end elevation of the bed knife.

Referring particularly to Fig. 1, the mower unit comprises frame members 10 connected and maintained in proper relationship by a tie tube 11, the reel axle 12 and the bed knife 13. Wheels 14 are mounted on the frame member 10 and operatively connected by means of a gear train (not shown) to the reel axle 12. A plurality of spiral fly knives 15 are mounted about the reel axle with their respective cutting edges lying in an approximate geometric cylinder concentric with said axle 12 and maintained in the desired relationship by spiders 16. Lugs 17 on the frame member 10 are provided for attachment of a handle to be used in propelling the machine over a lawn. At the rear of the unit is mounted a ground roller 18 and a suitable adjustment device 19 to control the position thereof relative to the frame.

The bed knife 13, in accordance with my prior invention already referred to, is pivotally mounted on an axis of rotation below that plane of tangency to the reel cylinder thru the cutting edge of the bed knife and behind said cutting edge. A manual adjustment, as, for example, the manual screw 20, is provided to positively limit rotation of the bed knife about its axis in the manner hereinafter more fully described. However, it is to be understood that the means of adjustment is not essential to the present invention and the bed knife here described may be suitably modified to adapt it to any desired adjusting means or used in a machine where adjustment is not provided.

Referring specifically to the bed knife, which embodies the novel features of this invention, I form the same from a strip of metal such as cold rolled steel of suitable width. This strip is folded into a loop to provide a rigid back of generally prismatic form having a rearward side 21, a bottom side 22 parallel to the ground and a top side 23 approximating parallelism with the adjacent cylindrical surface of the reel. As clearly shown in Figure 3, the edges of the strip when thus folded are extended in overlapping contact and joined to form an extension 24 of the side 22. One of the said edges, in this case the upper, is turned upwardly at an angle to the said extension 24 to form a lip 25 which serves as the cutting edge of the finished bed knife, and to provide longitudinal stiffness at the edge. The two layers of metal forming the extension 24 are in this case spot welded as indicated at 26 in Figure 2.

A plurality of rigid metallic insets 27 are so placed as to support the sides 22 and 23 of the bed knife structure. It has been found that highly satisfactory operation is achieved by employing one such inset at each end of the bed knife structure. This imparts substantial rigidity to the structure as a whole while leaving the same sufficiently resilient as to be largely immune to damage by striking obstructions.

Figure 5:
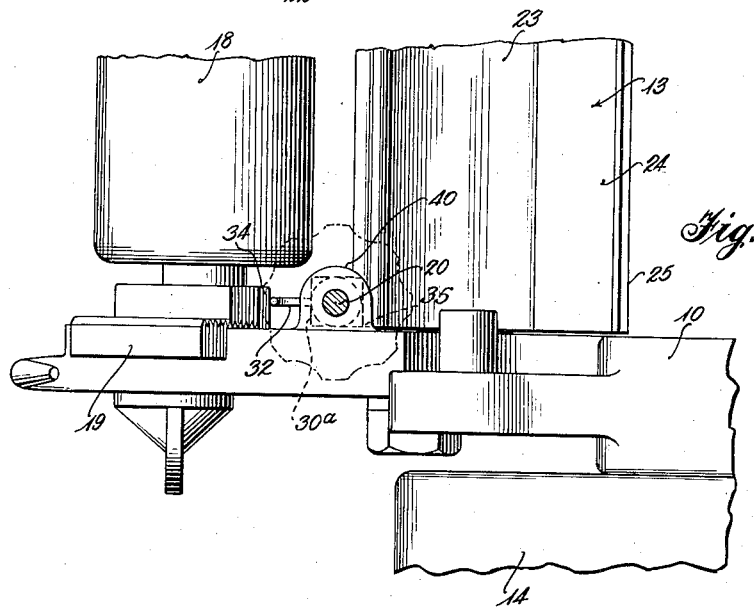
Fig. 5 is a fragmentary plan view of the same.

In Figures 2 and 3, I have shown an insert which is formed of heavy sheet or plate steel secured to the end of the tubular back portion, e. g., by continuous edge welding or spot welding. I have found, however, that it is desirable in many cases to form such an end plug in situ by die casting. When this is done I prefer to make a cut 35 of some kind (e. g., as shown in Fig. 5) near the end of the tubular back portion so that the metal will flow into the cut and key the casting securely in place. The threaded opening 28 in this case is preferably provided by an insert having suitable undercut portions whereby it is keyed into the casting.

Provision is made for pivotally mounting the bed knife and the bed knife is constructed with projecting members or the like to contact adjusting screws or springs according to the nature of the mower in connection with which the bed knife is to be used. In the embodiment of the invention disclosed here for purposes of illustration, the insets 27 are tapped and threaded, as at 28, to receive mounting bolts 29 which extend through suitable openings in the frame 10 of the assembled mower unit. A lateral projection 30 of each inset 27 acts as a cam follower in conjunction with a cam type adjustment more fully described in my copending application Serial No. 256,376, filed herewith. The upper surfaces of said projections rest against flattened portions on the under side of a rod 33 extending the width of the frame. A radial projection (not shown) on the end of the rod 33 is in contact with the lower end of adjusting screw 20. It will be readily understood that rotation of the screw 20 in a direction to cause it to move downward will cause rotation of the rod 33, whereupon the projections 30 will be depressed resulting in rotation of the bed knife toward the reel.

Figure 4:
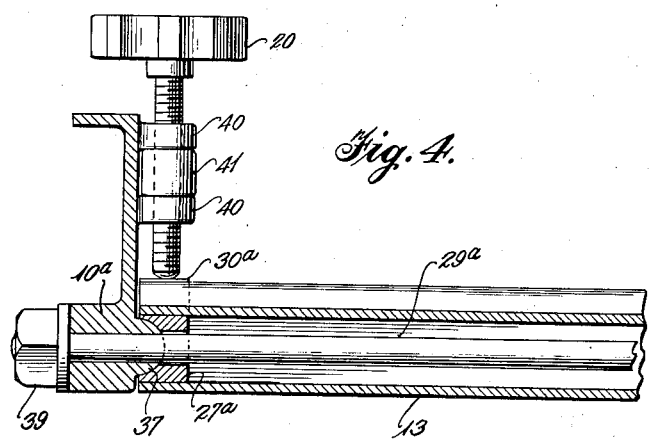
Fig. 4 is a fragmentary sectional view of one end of another bed knife and an adjacent part of the mower frame on which it is mounted.

It should be understood that my invention is in no way limited to use in connection with the adjusting device of my copending application, Serial No. 256,376, nor to any of the other inventions mentioned. In fact, it is one advantage of my invention that it makes possible the elimination of torque distributing devices such as the cam tube described in my said copending application, because it gives rigidity combined with lightness and resiliency and its hollow tubular form lends itself well to a tight mounting free from play which can be accurately adjusted by a single manual screw at one end. This is clearly shown in Figs. 4 and 5.

The side frames in this case as shown at 10a are formed with spherical projections 31; while the end plugs 27a are formed with corresponding spherical recesses so that the two cooperate to form a ball and socket joint. A long bolt 29a extends through one side frame 10a and through the tube 13 and is threaded into the other side frame and secured by a lock nut 39. With these ball and socket joints the bed knife is held rigidly with respect to its axis but rotatably without excessive friction.

The hand screw 20 in this case presses directly against the bed knife 13 and especially, as shown, on a projection 30a at the back thereof; and this need be used at one end only. Between the lugs 40 on the side frame, in which the screw 20 is threaded, is used a rubber block 41 provided with a hole a little smaller than the screw 20. This serves to hold the screw 20 in any position by resilient friction.

A spring 32 inserted in a hole 31 in the rear portion of each projection 30 bears against a lug 34 on the frame 10 thereby tending to cause the bed knife to be positioned for the maximum clearance allowed by the rod 33. The spring 32 is of a strength sufficient to maintain the clearance between the shearing knives at the adjusted maximum but insufficient to offer substantial resistance to the reaction due to cutting grass or the like.

Although I have shown and described a specific bed knife structure and a particular method of mounting the same, it is to be understood that this disclosure is not limiting or exhaustive of the invention, but, on the contrary, is presented for purposes of illustration to enable others skilled in the art to utilize the principles of my invention.

I claim:

1. In a rotary reel mower the combination of side frames having tapered projections, a hollow bed knife having a corresponding tapered recess adapted rotatably to fit said projection without lateral play, a rod extended through the frames and hollow bed knife coaxial with said projections and recesses, clamping means on the rod to hold the parts clamped together without play and means for adjusting the rotary position of the bed knife about its axis of mounting.

2. In a rotary reel mower the combination of side frames having parallel extensions adapted to receive between them a bed knife, a bed knife fitted between said extensions each of said extensions being engaged with an end of the bed knife through a ball and socket connection, one of said parts having a spherical projection thereon and the other a corresponding spherical depression, means for clamping said extensions together onto the ends of the bed knife whereby to hold the parts frictionally clamped together and accurately positioned without play, and means for adjusting the rotary position of the bed knife about its axis of mounting.

RICHARD D. CLEMSON.